US011269333B2

(12) United States Patent
 Kuwahara

(10) Patent No.: US 11,269,333 B2
(45) Date of Patent: Mar. 8, 2022

(54) AUTOMATIC DRIVE ASSIST APPARATUS

(71) Applicant: SUBARU CORPORATION, Tokyo (JP)

(72) Inventor: Keisuke Kuwahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 182 days.

(21) Appl. No.: 16/503,027

(22) Filed: Jul. 3, 2019

(65) Prior Publication Data

US 2020/0103903 A1 Apr. 2, 2020

(30) Foreign Application Priority Data

Sep. 28, 2018 (JP) .............................. JP2018-184744

(51) Int. Cl.
 *G05D 1/02* (2020.01)
 *G01C 21/20* (2006.01)
 (Continued)

(52) U.S. Cl.
 CPC ........... *G05D 1/0212* (2013.01); *G01C 21/20* (2013.01); *G01C 21/3415* (2013.01); *G05D 1/0088* (2013.01); *G05D 2201/0213* (2013.01)

(58) Field of Classification Search
 CPC ........... B60W 30/18163; B60W 10/20; B60W 2556/50; B60W 30/143; B60W 10/04;
 (Continued)

(56) References Cited

U.S. PATENT DOCUMENTS

2001/0037173 A1* 11/2001 Sekine ............... G01C 21/3697
 701/410
2017/0322042 A1* 11/2017 Yoon .................. G01C 21/3492
 (Continued)

FOREIGN PATENT DOCUMENTS

| JP | 11-083521 A | 3/1999 |
| JP | 2017-203638 A | 11/2017 |
| WO | 2017/006651 A1 | 1/2017 |

OTHER PUBLICATIONS

Japanese Notice of Reasons for Refusal issued in corresponding Japanese Patent Application No. 2018-184744, dated Jul. 7, 2020, with English translation.
 (Continued)

*Primary Examiner* — Alexander G Kalinowski
*Assistant Examiner* — Sanjeev Malhotra
(74) *Attorney, Agent, or Firm* — McDermott Will & Emery LLP

(57) ABSTRACT

An automatic drive assist apparatus includes a storage, an own-vehicle position estimator, a route-information input device, a traveling route setter, and an automatic drive controller including a rerouting request determiner, a course comparator, and a course-change achievability determiner. The automatic drive controller causes an own vehicle automatically traveling along a traveling route determined by the traveling route setter. When the rerouting request determiner determines that a new traveling route is reconstructed in response to a rerouting request, the course comparator reads a candidate route of the new traveling route, compares the candidate route with the traveling route determined before the reconstruction, and determines whether a route change is (Continued)

set. When the route change is determined not to be achievable by the course-change achievability determiner, the automatic drive controller causes the own vehicle to keep automatically driving along the traveling route determined before the reconstruction.

7 Claims, 5 Drawing Sheets

(51) Int. Cl.
*G05D 1/00* (2006.01)
*G01C 21/34* (2006.01)

(58) Field of Classification Search
CPC .. B60W 10/18; B60W 2552/30; B60W 50/14; B60W 2420/42; B60W 2555/60; B60W 2420/52; B60W 2520/10; B60W 2554/00; B60W 2554/804; B60W 2720/106; B60W 30/10; B60W 50/10; B60W 10/184; B60W 2552/00; B60W 2554/4041; B60W 2710/20; B60W 2720/10; B60W 2754/30; B60W 30/12; B60W 30/14; B60W 30/16; B60W 30/18154; B60W 60/0053; B60W 10/06; B60W 10/10; B60W 2050/0008; B60W 2050/143; B60W 2050/146; B60W 2400/00; B60W 2540/215; B60W 2540/30; B60W 2554/80; B60W 2554/801; B60W 2554/802; B60W 30/00; B60W 30/02; B60W 30/045; B60W 30/09; B60W 30/165; B60W 40/04; G01C 21/3415; G01C 21/34; G01C 21/3407; G01C 21/3492; G01C 21/26; G01C 21/30; G01C 21/3484; G01C 21/3605; G01C 21/3617; G05D 2201/0213; G05D 1/0088; G05D 1/0061; G05D 1/0214; G05D 1/0257; G05D 1/0212; G05D 1/0223; G05D 1/0231; G05D 1/0278; G08G 1/167; G08G 1/166; G08G 1/0969; G08G 1/00; G08G 1/096844; G06K 9/00798; B60R 21/00; B60T 7/12; B60T 7/22; B60T 8/17; B62D 15/025; B62D 15/0255; B62D 6/00; B62D 6/003; G09B 29/10
USPC .................................. 701/26, 41, 410; 1/1
See application file for complete search history.

(56) References Cited

U.S. PATENT DOCUMENTS

| | | | |
|---|---|---|---|
| 2017/0323566 A1 | 11/2017 | Suto | |
| 2018/0022382 A1* | 1/2018 | Akatsuka | B60W 30/18145 |
| | | | 701/41 |
| 2018/0065630 A1* | 3/2018 | Tamura | B60W 10/20 |
| 2018/0086373 A1* | 3/2018 | Tamura | B60W 40/06 |
| 2018/0136662 A1* | 5/2018 | Kim | G01C 21/3415 |
| 2018/0188047 A1* | 7/2018 | Inoue | G01C 21/3484 |
| 2018/0209795 A1* | 7/2018 | Okuyama | G01C 21/30 |
| 2018/0218602 A1* | 8/2018 | Okuyama | G08G 1/096827 |
| 2018/0224852 A1* | 8/2018 | Tanahashi | G01C 21/3407 |
| 2018/0299281 A1* | 10/2018 | Takashima | G01C 21/3664 |
| 2018/0314252 A1 | 11/2018 | Asakura et al. | |
| 2018/0345968 A1* | 12/2018 | Yasui | B60W 30/12 |
| 2019/0061780 A1* | 2/2019 | Han | B60W 30/143 |
| 2019/0064827 A1* | 2/2019 | Goto | B60W 60/0053 |
| 2019/0146495 A1* | 5/2019 | Yan | B60W 40/08 |
| | | | 701/26 |
| 2019/0250001 A1* | 8/2019 | Nakamura | G05D 1/0088 |
| 2019/0317506 A1* | 10/2019 | Ishioka | G05D 1/0088 |
| 2019/0354108 A1* | 11/2019 | Okajima | G01C 21/3415 |
| 2019/0375405 A1* | 12/2019 | Mizoguchi | B60W 30/143 |
| 2019/0382019 A1* | 12/2019 | Abe | G08G 1/167 |
| 2019/0382020 A1* | 12/2019 | Niibo | B60W 30/18163 |
| 2019/0382021 A1* | 12/2019 | Niibo | B60W 10/04 |
| 2019/0382022 A1* | 12/2019 | Niibo | B60W 30/165 |
| 2019/0384305 A1* | 12/2019 | Niibo | B60W 30/14 |
| 2019/0389465 A1* | 12/2019 | Ogino | B60W 30/143 |
| 2020/0070834 A1* | 3/2020 | Mizoguchi | B60W 30/18163 |
| 2020/0082724 A1* | 3/2020 | Oguro | G01S 13/931 |
| 2020/0173793 A1* | 6/2020 | Koshiba | B60W 30/10 |

OTHER PUBLICATIONS

Japanese Notice of Reasons for Refusal issued in corresponnding Japanese Patent Application No. 2018-184744, dated Feb. 2, 2021, with English translation.

Japanese Notice of Reasons for Refusal issued in corresponnding Japanese Patent Application No. 2018-184744, dated Jun. 8, 2021, with English translation.

* cited by examiner

AUTOMATIC DRIVE ASSIST APPARATUS

CROSS-REFERENCE TO RELATED APPLICATIONS

The present application claims priority from Japanese Patent Application No. 2018-184744 filed on Sep. 28, 2018, the entire contents of which are hereby incorporated by reference.

BACKGROUND

The technology relates to an automatic drive assist apparatus that causes an own vehicle to automatically travel along a predetermined route.

A typical vehicle navigation system mounted on a vehicle driven by a driver (hereinafter referred to as an "own vehicle") detects a current position of the own vehicle in response to setting of a destination by the driver. The current position of the own vehicle is detected on the basis of position data received from positioning satellites of a global navigation satellite system (GNSS), such as the global positioning system (GPS). The current position of the own vehicle is matched with a high-definition road map or a dynamic map to determine a traveling route from the current position of the own vehicle to the destination. The own vehicle is guided to the destination along the traveling route. During the travel of the own vehicle along the traveling route, the own vehicle is automatically driven by the automatic drive assist apparatus on behalf of the driver over a part or the entire traveling path on an express way or an ordinary road.

During the automatic driving of the own vehicle, it is basically unnecessary for the driver to hold a steering wheel and visually observe an environment in front of the own vehicle all the time. This allows the driver to feel relaxed to some extent until the driver receives a request to hold the steering wheel from the automatic drive assist apparatus. Accordingly, it is possible for the occupant (the driver, in most circumstances) of the own vehicle to make a rerouting request by his/her voice or operating a terminal device, such as a touch panel of a monitor, a portable device, or a personal computer, during the automatic driving. Examples of the rerouting request include a request for changing the destination, and adding, changing, or deleting a transit point. Note that the rerouting may also be requested by an occupant sitting in the front passenger seat, for example.

For example, in a technique disclosed in International Publication No. WO2017/006651, a new traveling route that includes an automatic drive region is constructed in response to setting of a new destination by the driver during the automatic drive assist control. The automatic drive region is a region in which the own vehicle is allowed to travel under the automatic drive assist control. In a case where the automatic drive region in the new traveling route is different from that in the current traveling route, it is determined whether a route change from the current traveling route to the new traveling route is achievable. When the route change to the new traveling route is achievable, the automatic driving is executed in the automatic drive region set in the new traveling route.

SUMMARY

An aspect of the technology provides an automatic drive assist apparatus including a storage, an own-vehicle position estimator, a route-information input device, a traveling route setter, and an automatic drive controller. The storage is configured to hold information on a road map. The own-vehicle position estimator is configured to estimate a current position of an own vehicle. The route-information input device is configured to receive an input of information on a destination. The traveling route setter is configured to construct a traveling route on the basis of the information on the road map held in the storage. The traveling route connects the current position of the own vehicle estimated by the own-vehicle position estimator and the destination inputted through the route-information input device. The automatic drive controller is configured to execute automatic driving of the own vehicle along the traveling route constructed by the traveling route setter. The automatic drive controller includes a rerouting request determiner, a course comparator, and a course-change achievability determiner. The rerouting request determiner is configured to determine whether a new traveling route is reconstructed in response to a rerouting request for changing the traveling route constructed by the traveling route setter. The course comparator is configured to, when the rerouting request determiner determines that the new traveling route is reconstructed, read a candidate route of the new traveling route reconstructed by the traveling route setter, compare the candidate route with the traveling route determined before the reconstruction in terms of a direction with respect to a diverging course closest to the current position of the own vehicle and thereby determine whether a route change in a different direction is set. The course-change achievability determiner is configured to, when the course comparator determines that the route change is set with respect to the diverging course closest to the current position of the own vehicle, determine whether the route change is achievable. The automatic drive controller is configured to, when the course-change achievability determiner determines that the route change is not achievable, cause the own vehicle to keep continuing the automatic driving along the traveling route determined before the reconstruction of the new traveling route.

An aspect of the technology provides an automatic drive assist apparatus including a storage, a route-information input device, and circuitry. The storage is configured to hold information on a road map. The route-information input device is configured to receive an input of information on a destination. The circuitry is configured to: estimate a current position of the own vehicle; construct a traveling route on a basis of the information on the road map held in the storage, the traveling route connecting the current position of the own vehicle estimated and the destination inputted through the route-information input device; and execute automatic driving of the own vehicle along the traveling route constructed, the circuitry being configured to: during the automatic driving of the own vehicle, determine whether a new traveling route is reconstructed in response to a rerouting request for changing the traveling route constructed; read, when the new traveling route is reconstructed, a candidate route of the new traveling route reconstructed; compare the candidate route with the traveling route determined before the reconstruction in terms of a direction with respect to a diverging course closest to the current position of the own vehicle, and thereby determine whether a route change in a different direction is set; determine, when the course comparator determines that the route change is set with respect to the diverging course closest to the current position of the own vehicle, whether the route change is achievable; and cause, when the route change is determined not to be achievable, the own vehicle to keep continuing the automatic driving along the traveling route determined before the reconstruction of the new traveling route.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
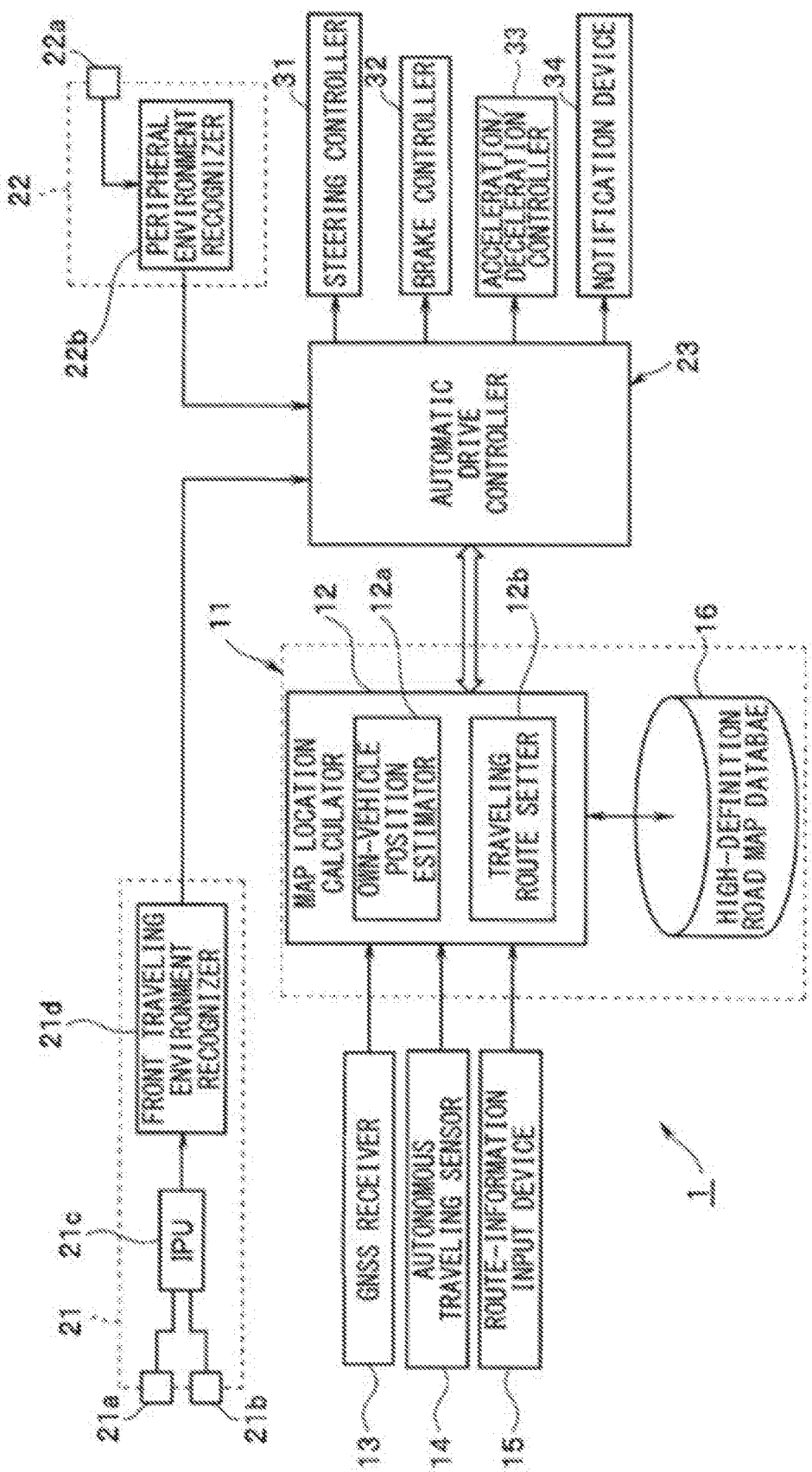
FIG. 1 is a block diagram of an automatic drive assist system according to one example embodiment of the technology.

In the following, some embodiments of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

In typical techniques including the above-described technique disclosed in International Publication No. WO2017/006651, a traveling route is constructed which guides an own vehicle to a new destination set by the driver during the driving in an automatic drive mode. When the driver permits the route change to the traveling route, an automatic drive controller starts executing automatic driving along the traveling route. In an example situation where a current traveling route set in a straight-ahead direction is changed to a new traveling route set in a diverging direction, the automatic drive controller executes steering control that causes the own vehicle traveling along the current traveling route set in the straight-ahead direction to travel along the new traveling route set in the diverging direction.

To achieve such a route change in an example case where the own vehicle is traveling on the middle lane of a road having three lanes and where a diverging course branches off the left lane of the road, the own vehicle is first caused to make a lane change from the middle lane to the left lane and then caused to make the route change to the diverging course. In this case, another vehicle traveling on the left lane side by side with or close to the own vehicle can hinder the own vehicle from making the route change.

In such a case, it is difficult to continue the automatic driving along the traveling route. The automatic drive controller, therefore, switches the automatic drive mode to a drive assist mode. In the drive assist mode, known adaptive cruise control (ACC) and known active lane keep (ALK) control are executed while an environment in front of the own vehicle is being recognized by a stereo camera, for example.

In the drive assist mode, the driver is required to hold a steering wheel. If the automatic drive mode is switched to the drive assist mode while the own vehicle M is keep traveling along the same traveling route even after the reconstruction of the traveling route, the driver might feel confused or uncomfortable.

In another example situation where a new traveling route is set in a straight-ahead direction immediately before a start of steering control that causes the own vehicle to travel along a current traveling route set in the diverging direction, and where the automatic drive controller switches the steering control to steering control that causes the own vehicle to travel along the new traveling route set in the straight-ahead direction, the steering operation can be unstable, which can make the driver feel uncomfortable.

The same can be applied to an example case where another rerouting request is made for, for example, adding, changing, or deleting a transit point, as well as the example case where the rerouting request for changing the destination is made.

It is desirable to provide an automatic drive assist apparatus that makes it possible to reduce the feeling of confusion or discomfort of the driver without switching the automatic drive mode to the drive assist mode even when a route change to a traveling route reconstructed in response to a rerouting request from an occupant is not achievable in time.

Figure 4:
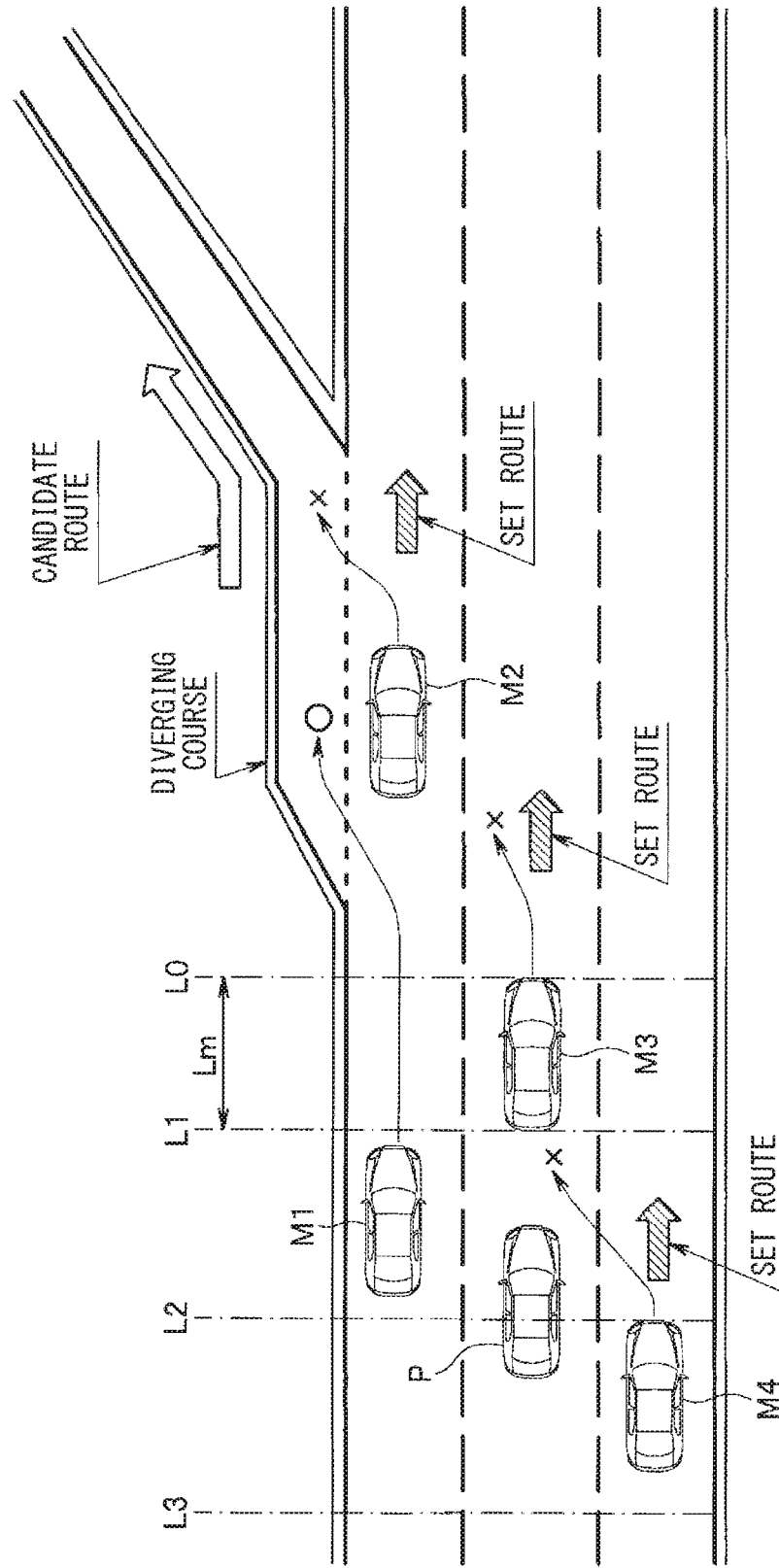
FIG. 4 is an explanatory diagram illustrating an example situation where a candidate route is set in a diverging direction in response to a rerouting request from an occupant under the condition that a traveling route has been set in a straight-ahead direction.
Figure 5:
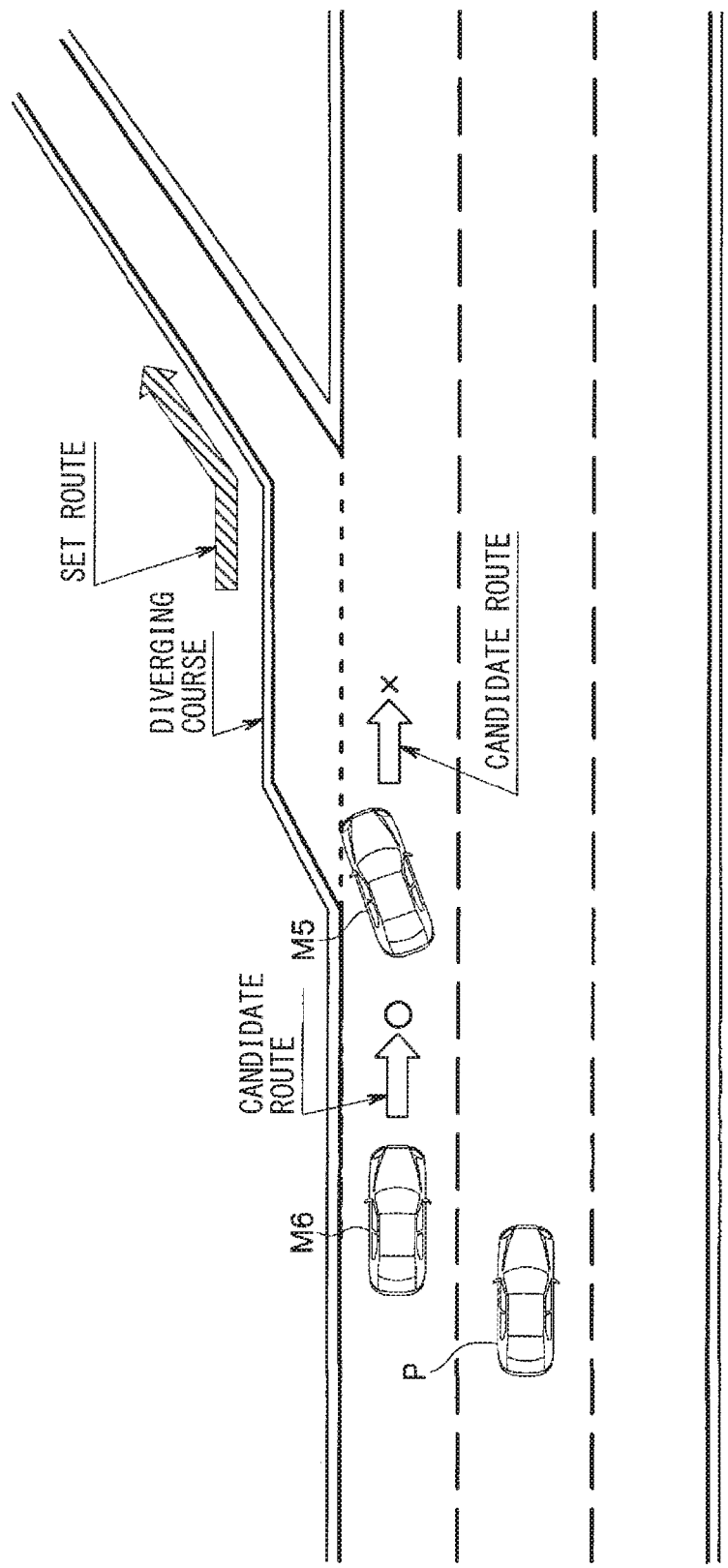
FIG. 5 is an explanatory diagram illustrating an example situation where a candidate route is set in a straight-ahead direction in response to a rerouting request from an occupant under the condition that a traveling route has been set in a diverging direction.

An automatic drive assist system illustrated in FIG. 1 may be mounted on an own vehicle M (refer to M1 to M6 in FIGS. 4 and 5). The automatic drive assist system 1 may include a locator unit 11, a camera unit 21, a peripheral monitoring unit 22, and an automatic drive controller 23. The locator unit 11 may detect a current position of the own vehicle M (hereinafter referred to as an "own-vehicle position"). The camera unit 21 may recognize a traveling environment in front of the own vehicle M. In one embodiment of the technology, the automatic drive controller 23 may serve as an "automatic drive controller". A redundant system may be provided that causes another component to temporarily perform the automatic drive assistance upon a malfunction of the locator unit 11 or the camera unit 21.

The automatic drive controller 23 may compare data acquired by the locator unit 11 with data acquired by the camera unit 21 to constantly monitor whether features of the road on which the own vehicle M is currently traveling are the same therebetween. When the features of the road on which the own vehicle M is currently traveling are the same, the automatic drive assistance continues to be executed.

The locator unit 11 may estimate a position of the own vehicle M on a road map and acquire road map data on a region around and in front of the estimated position of the own vehicle M. The camera unit 21 may calculate a curvature of the middle of the road defined by lane lines that respectively define a right side and a left side of the lane on which the own vehicle M is traveling (hereinafter referred to as an "own-vehicle traveling lane"). The camera unit 21 may also detect a deviation of the own vehicle M in a lateral direction along the width of the own vehicle M. The deviation may be determined with the middle of the road defined by the right and left lane lines being a reference line. Additionally, the camera unit 21 may recognize a preceding vehicle traveling ahead of the own vehicle M, three-dimensional objects, the lane lines that respectively define the right side and the left side of the own-vehicle traveling lane, a traffic sign, and an indicator or a color of a traffic signal, for example. Specific but non-limiting examples of the three-dimensional objects may include a moving object, such as a pedestrian or a bicycle, a motorcycle, or another two-wheel vehicle.

The locator unit 11 may include a map location calculator 12 and a high-definition road map database 16. In one embodiment of the technology, the high-definition road map database 16 may serve as a "storage". The map location calculator 12, a front traveling environment recognizer 21d described below, a peripheral environment recognizer 22b described below, and the automatic drive controller 23 may each include a known microcomputer that includes a central processing unit (CPU), a random access memory (RAM), a read only memory (ROM), or a non-volatile memory, and a peripheral device, for example. Programs to be executed in the CPU or fixed data such as data tables may be preliminarily stored in the ROM.

The map location calculator 12 has an input that may be coupled to a global navigation satellite system (GNSS) receiver 13, an autonomous traveling sensor 14, and a route-information input device 15. In one embodiment of the technology, the route-information input device 15 may serve as a "route-information input device". The GNSS receiver 13 may receive positioning signals from a plurality of positioning satellites. The autonomous traveling sensor 14 may enables autonomous traveling in an environment, such as a region inside a tunnel, in which it is difficult to receive valid positioning signals from the GNSS satellites due to low sensitivity of the GNSS receiver 13. The autonomous traveling sensor 14 may include a vehicle speed sensor, a yaw rate sensor, and a frontward/backward acceleration sensor, for example. The map location calculator 12 may determine a travel distance and an azimuth of the own vehicle M on the basis of a vehicle speed detected by the vehicle speed sensor, a yaw rate or a yaw angle speed detected by the yaw rate sensor, and a frontward or backward acceleration rate detected by the frontward/backward acceleration sensor, and thereby perform localization of the own vehicle M.

The route-information input device 15 may be a terminal device to be operated by the occupant (or the driver, in most circumstances). A series of operations relevant to the automatic driving, such as turning on/off of the automatic driving, setting of a destination or a transit point, and making a rerouting request for changing the destination or adding, changing, or deleting a transit point may be intensively performed using the route-information input device 15. For example, the route-information input device 15 may be an input section of a car navigation system, a portable device, or a personal computer. The route-information input device 15 may be in wired or wireless connection with the map location calculator 12.

When the occupant operates the route-information input device 15 to turn on or off the automatic driving, input data on a destination or a transit point (e.g., the name, address, or telephone number of the facility), or delete the destination or the transit point inputted, the map location calculator 12 may read the input data. In a case where data on a destination or a transit point is inputted, the map location calculator 12 may determine the positional coordinate (i.e., latitude and longitude) of the destination or the transit point.

The map location calculator 12 may include an own-vehicle position estimator 12a that estimates the position of the own vehicle M and a traveling route setter 12b that determines a traveling route from the position of the own vehicle to the destination via the transit point. In one embodiment of the technology, the own-vehicle position estimator 12a may serve as an "own-vehicle position estimator". In one embodiment of the technology, the traveling route setter 12b may serve as a "traveling route setter".

The high-definition road map database 16 may include a mass storage medium, such as a hard disk drive (HDD), that stores known high-definition road map information or a local dynamic map. The high-definition road map information may have a multilayered structure that includes an undermost base layer and some layers superimposed on the undermost base layer. The undermost base layer may include static information. The layers superimposed on the undermost base layer may include additional map information necessary for supporting the automatic driving. The additional map information may include static position data and dynamic position data. Specific but non-limiting examples of the static position data may include data on types of roads (e.g., an ordinary road or an expressway), data on features of roads, data on right and left lane lines, data on traffic signs, data on stop lines, data on intersections, and data on traffic signals. Specific but non-limiting examples of the dynamic position data may include data on traffic congestions, data on traffic accidents, and data on traffic regulations due to construction works.

The own-vehicle position estimator 12a may acquire a current position coordinate (i.e., latitude and longitude) of the own vehicle M on the basis of the positioning signals received at the GNSS receiver 13. The own-vehicle position estimator 12a may perform map matching of the position coordinate of the own vehicle M on the road map to estimate the own-vehicle position or the current position of the own vehicle M on the road map. The own-vehicle position estimator 12a may identify a traveling lane on which the own vehicle M is traveling, read, from the road map information, the data on the features of the road having the traveling lane on which the own vehicle M is traveling, and store the data therein in a sequential manner.

When the own vehicle M is traveling in an environment, such as a region inside a tunnel, in which it is difficult to receive valid positioning signals from the GNSS satellites due to low sensitivity of the GNSS receiver 13, the own-vehicle position estimator 12a may switch the automatic driving to autonomous navigation, and may perform localization using the autonomous traveling sensor 14.

On the basis of the position coordinate of the own vehicle M estimated by the own-vehicle position estimator 12a and the position coordinate (i.e., latitude and longitude) of the destination (and the transit point, if any) inputted, the traveling route setter 12b may construct a traveling route connecting the own-vehicle position and the position of the destination (via the transit point, if any) referring to the local dynamic map stored in the high-definition road map database 16. The traveling route may be constructed in accordance with predetermined route conditions, such as a recommended route or a shortest route. Every traveling route determined may extend over several hundred meters to several kilometers ahead from the own vehicle M. When the occupant makes a rerouting requests for changing the destination or adding, changing, or deleting the transit point by operating the route-information input device 15 during the traveling of the own vehicle M, the traveling route setter 12b may reconstruct a traveling route. Thereafter, the traveling route setter 12b may set the initial several hundred meters to several kilometers, away ahead from the own vehicle M, of the reconstructed traveling route as a yet-to-be-determined traveling route (hereinafter also referred to as a "candidate route").

The camera unit 21 may include a vehicle-mounted camera 21, an image processor (IPU) 21c, and a front traveling environment recognizer 21d. For example, the vehicle-mounted camera may be a stereo camera fixed on an upper middle portion of the front interior compartment of the own vehicle M. The stereo camera may include a main camera 21a and a sub-camera 21b that are disposed laterally symmetrical about an axis extending in the middle of the width of the own vehicle M. The camera unit 21 may acquire data on a reference image captured by the main camera 21a and data on a comparative image captured by the sub-camera 21b.

The reference image data and the comparative image data may be subjected to a predetermined image process at the IPU 21c. The front traveling environment recognizer 21d may read the reference image data and the comparative image data having been subjected to the image process at the IPU 21c, identify the same object appearing in both of the reference image and the comparative image on the basis of a parallax therebetween, and calculate, through triangulation, distance data on a distance from the own vehicle M to the identified object, and thereby obtain front traveling environment information. The front traveling environment information may include data on the features of the road having the traveling lane on which the own vehicle M is traveling. Specific but non-limiting examples of the features of the road may include right and left lane lines, the curvature [1/m] of the middle of the road defined between the right and left lane lines, and the width between the right and left lane lines or a lane width, intersections, crosswalks, traffic signals, traffic signs, and roadside obstacles, such as power poles, telephone poles, guardrails, walls, and vehicles parked.

The peripheral monitoring unit 22 may monitor objects (e.g., vehicles, pedestrians, or two-wheel vehicles) moving around the own vehicle M. The peripheral monitoring unit 22 may include a peripheral monitoring sensor 22a and a peripheral environment recognizer 22b. The peripheral monitoring sensor 22a may include an ultrasonic sensor or a millimeter-wave radar, or may utilize light detection and ranging (LIDAR), for example. The peripheral environment recognizer 22b may recognize objects moving around the own vehicle M on the basis of signals transmitted from the peripheral monitoring sensor 22a.

The automatic drive controller 23 has an input that may be coupled to the front traveling environment recognizer 21d of the camera unit 21. The automatic drive controller 23 may also be coupled to the map location calculator 12 via in-vehicle communication, such as controller area network (CAN), to establish bidirectional communication between the automatic drive controller 23 and the map location calculator 12. The automatic drive controller 23 has an output that may be coupled to a steering controller 31, a brake controller 32, an acceleration/deceleration controller 33, and a notification device 34. The steering controller 31 may cause the own vehicle M to travel along the traveling route. The brake controller 32 may decelerate the own vehicle M by forcible braking. The acceleration/deceleration controller 33 may control a vehicle speed of the own vehicle M. The notification device 34 may include a monitor or a speaker, for example.

The automatic drive controller 23 may control the steering controller 31, the brake controller 32, and the acceleration/deceleration controller 33 in a predetermined manner to cause the own vehicle M to automatically travel, on the basis of the positioning signals received at the GNSS receiver 13, along the traveling route constructed by the traveling route setter 12b. During the automatic traveling of the own vehicle M, the automatic drive controller 23 may perform known adaptive cruise control (ACC) and known active lane keep (ALK) control on the basis of the front traveling environment recognized by the front traveling environment recognizer 21d. When a preceding vehicle is detected which is traveling ahead of the own vehicle M, the automatic drive controller 23 may cause the own vehicle M to travel following the preceding vehicle. When no preceding vehicle is detected, the automatic drive controller 23 may cause the own vehicle M to travel at a vehicle speed equal to or lower than a speed limit. When an object, such as a pedestrian or a two-wheel vehicle, is detected which is trying to cross a region immediately ahead of the own vehicle M, the automatic drive controller 23 may actuate the brake controller 32 to stop the own vehicle M.

During the automatic driving of the own vehicle M, it is basically unnecessary for the driver to hold a steering wheel and visually observe an environment in front of the own vehicle M all the time. This allows the driver to feel relaxed to some extent until the driver receives a request to hold the steering wheel from the automatic drive assist apparatus. Accordingly, it is possible for the occupant (the driver, in main cases) to make a rerouting request for changing the destination or adding changing, or deleting the transit point by operating a terminal device or another device during the automatic driving.

When receiving, from the route-information input device 15, the rerouting request for changing the destination or adding or deleting the transit point, the traveling route setter 12b may reconstruct a traveling route in accordance with the route conditions described above. In a condition where the new traveling route reconstructed urges the own vehicle M to make a route change at a position ahead of the own vehicle M, a steering operation necessary for the route change is not achievable in time, or the route change is hindered by the positional relation between the own vehicle M and a vehicle traveling side by side with the own vehicle M, in some cases.

In such cases, the automatic drive controller 23 may temporarily halt the automatic driving and make a transition of a traveling mode from the automatic drive mode to the drive assist mode in which the ACC and the ALK control are executed. However, the own vehicle M is still traveling along the traveling route set before the reconstruction. Therefore, such switching of the traveling mode from the automatic drive mode to the drive assist mode can make the driver feel confused or uncomfortable.

To address this, when the new traveling route is reconstructed by the traveling route setter 12b in response to the rerouting request from the route-information input device 15, the automatic drive controller 23 may determine whether the route change to the reconstructed traveling route is achievable. When the route change is determined not to be achievable in time, the automatic drive controller 23 may send, to the locator unit 11, a command to recalculate a traveling route. During the recalculation, the own vehicle M may be kept traveling along the current traveling route set before the reconstruction.

Figure 2:
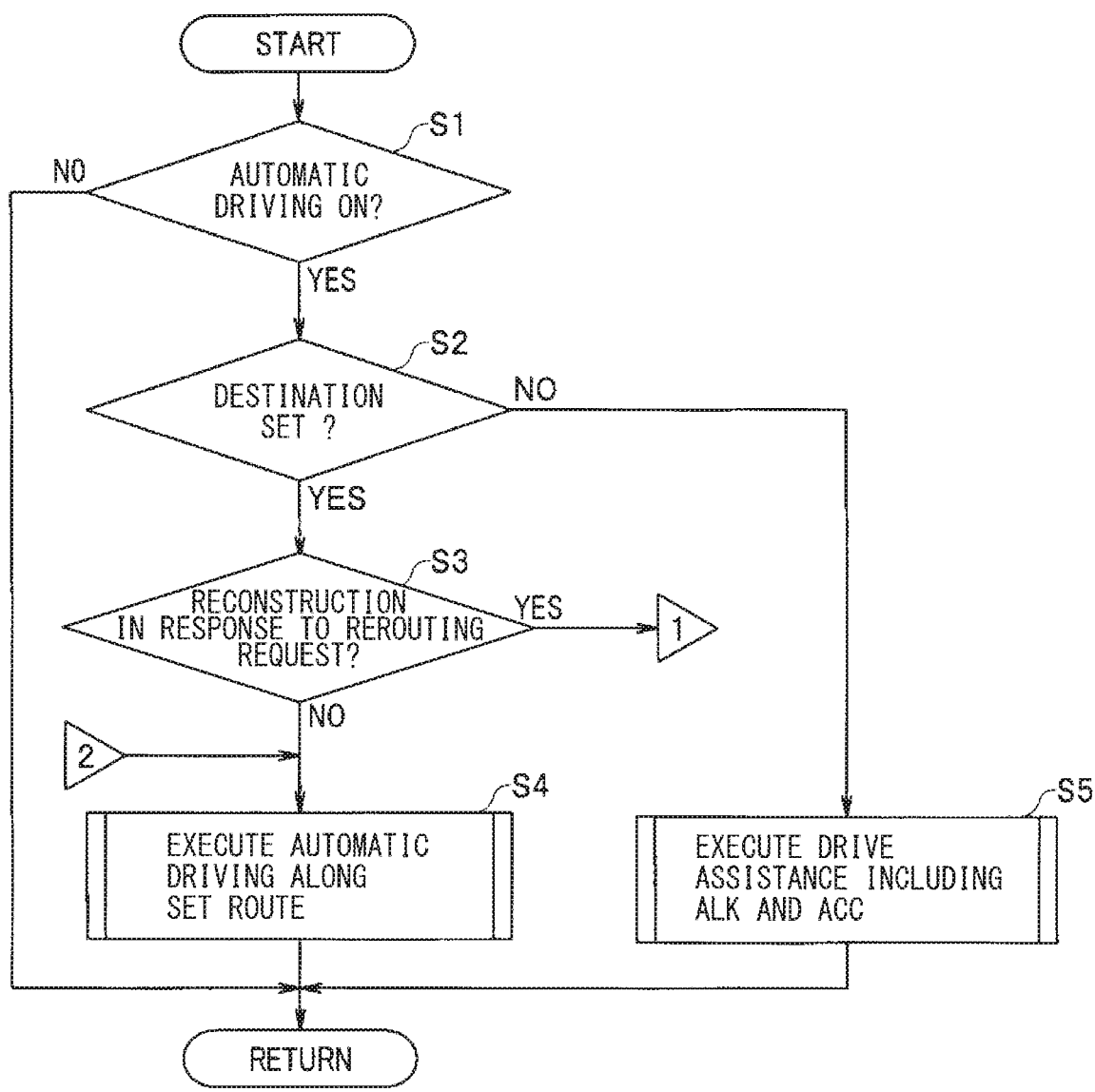
FIG. 2 is a flowchart illustrating an example routine of an automatic drive control process according to one example embodiment of the technology.
Figure 3:
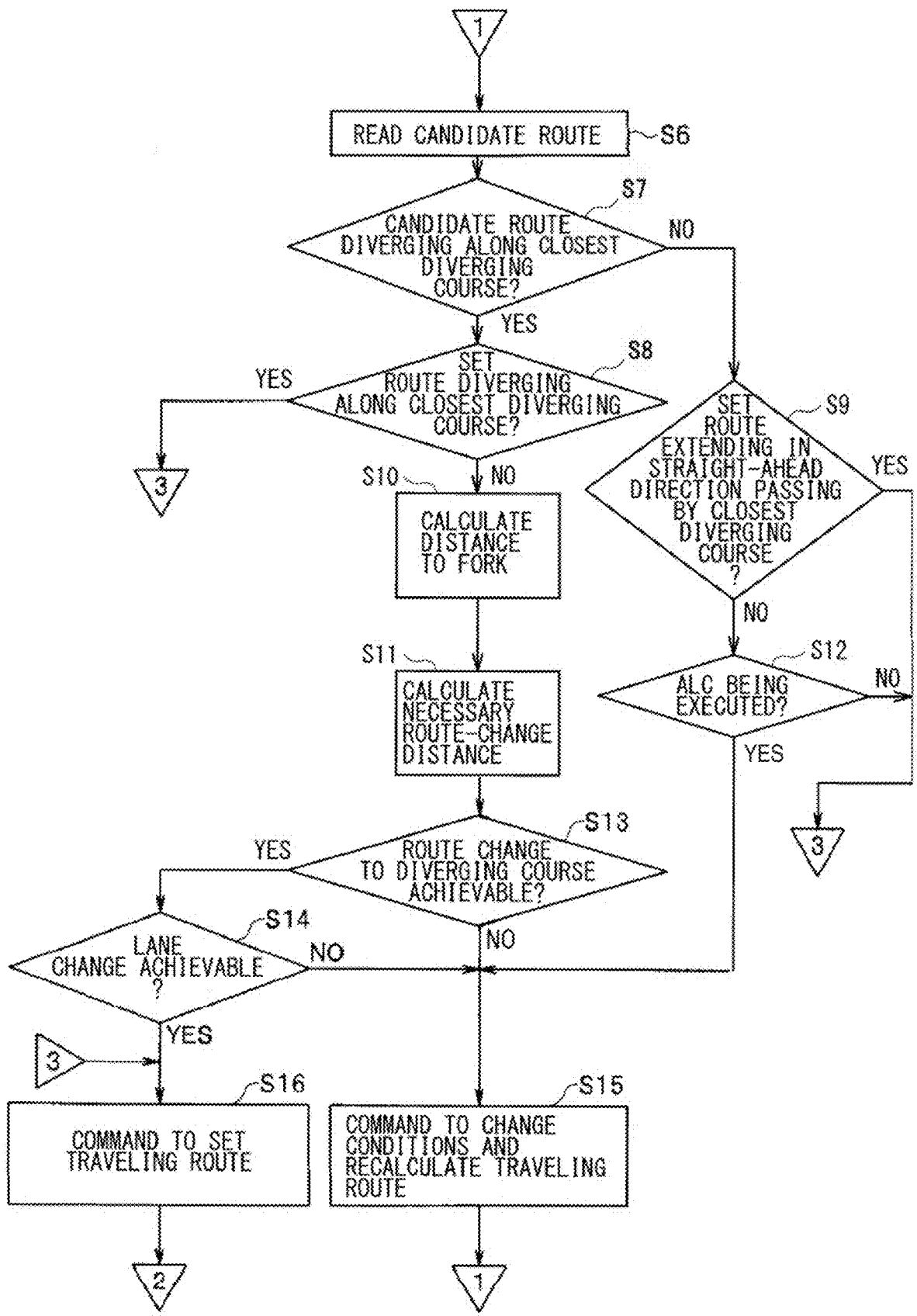
FIG. 3 is a flowchart illustrating an example routine of the automatic drive control process illustrated in FIG. 2.

Such verification of the new traveling route may be executed by the automatic drive controller 23 following an example routine of an automatic drive control process illustrated in FIGS. 2 and 3.

The automatic drive control process may start with Step S1 in which a determination may be made of whether the automatic driving is turned on. The determination may be based on an automatic driving on/off signal transmitted from the route-information input device 15 through the locator unit 11. When the automatic driving is turned off (NO in Step S1), the procedure may exit the routine. In contrast, when the automatic driving is turned on (YES in Step S1), the procedure may proceed to Step S2. In Step S2, a determination may be made of whether a destination has been set. The determination may be based on the status of the traveling route setter 12b in the locator unit 11.

When the traveling route is constructed by the traveling route setter 12b, the destination has been set (YES in Step S2), and the procedure may proceed from Step S2 to Step S3. In contrast, when the traveling route is not constructed by the traveling route setter 12b, the destination has not been set (NO in Step S2), and the procedure may branch to Step S5.

In Step S5, the ALK control may be executed that controls a lateral position of the own vehicle M on the basis of the right and left lane lines recognized by the front traveling environment recognizer 21d of the camera unit 21. Additionally, the ACC may be executed that causes the own vehicle M to travel in the drive assist mode in which a longitudinal position of the own vehicle M is controlled. Thereafter, the procedure may exit the routine.

In Step S3, a determination may be made of whether a traveling route is reconstructed in response to the rerouting request from the occupant. The determination may be based on the result of the calculation by the traveling route setter 12b in the locator unit 11. When the rerouting request is not made and thus no traveling route is reconstructed (NO in Step S3), the procedure may proceed to Step S4. In Step S4, the own vehicle M may be caused to travel in the automatic drive mode along the traveling route set by the traveling route setter 12b (hereinafter referred to as a "set route"). The procedure may thereafter exit the routine.

In contrast, when the rerouting request for changing the destination or adding, changing, or deleting the transit point is made and a traveling route is thus reconstructed by the traveling route setter 12b (YES in Step S3), the procedure may branch to Step S6. In Step S6, the initial several hundred meters to several kilometers, away ahead from the own vehicle M, of the traveling route reconstructed by the traveling route setter 12b may be read as a yet-to be determined part (i.e., a candidate route). In one embodiment of the technology, the automatic drive controller 23 that executes Step S3 may serve as a "rerouting request determiner".

Thereafter, in Step S7, a determination may be made of whether the candidate route extends in a diverging direction along a diverging course closest to the current position of the own vehicle M. In this example embodiment, the wording "diverging course closest to the own vehicle M" and the wording "closest diverging course" refer to a diverging course one kilometer or less away ahead from the own vehicle M. However, the distance from the own vehicle M to the closest diverging course should not be limited to the distance described in this example embodiment.

When the candidate route extends in the diverging direction along the closest diverging course (YES in Step S7), the procedure may proceed to Step S8. In contrast, when the candidate route extends in a straight-ahead direction passing by the closest diverging course (NO in Step S7), the procedure may branch to Step S9.

In Step S8, a determination may be made of whether the set route determined before the reconstruction extends in the diverging direction along the closest diverging course. When the set route diverges in the diverging direction (YES in Step S8), the set route and the latest candidate route may be determined to be identical to each other, and the procedure may jump to Step S16.

In contrast, when the set route extends in the straight-ahead direction passing by the closest diverging course (NO in Step S8), the procedure may proceed to Step S10. In Step S10, a distance Lk from the own vehicle M to a fork L0 set behind the entrance of the diverging course (hereinafter referred to as a "reach distance Lk") may be determined on the basis of the high-definition road map information. As illustrated in FIG. 4, the own vehicle M may start the steering operation at the fork L0 to make a route change to the traveling route extending in the diverging direction. The fork L0 may be set several ten meters behind the entrance of the diverging course. Note that the reference characters M1 to M4 are assigned to the own vehicle M in FIG. 4 for the purpose of illustration of positions of the own vehicle M on the traveling lane.

Thereafter, in Step S11, a determination may be made of whether the route change to the diverging course is achievable. The determination may be based on the distance from the current position of the own vehicle M to the fork L0. First, a distance $L\alpha$ necessary for the route change (hereinafter referred to as a "necessary route-change distance $L\alpha$") may be calculated. The necessary route-change distance may serve as a threshold for the determination of the achievability of the route change.

In an example situation illustrated in FIG. 4 where the diverging course diverges from the left lane of a road having several (three in FIG. 4) lanes and where the own vehicle M reads the candidate route set in the diverging direction along the diverging course at the fork L0 on the left lane, the route change to the diverging course is just barely achievable provided that the own vehicle M has been decelerated to a predetermined vehicle speed. In another example situation where the own vehicle M traveling on the left lane is passing through the position M2 in an entrance area of the diverging course, the route change to the diverging course is not achievable.

When the driver of the own vehicle M intentionally turns the steering wheel in the diverging direction at the position M2, steering override is detected, and the automatic driving is temporarily halted. This allows the own vehicle M to make the route change to the diverging course. In this case, a traveling route may be reconstructed by automatic rerouting while the own vehicle M is traveling on the diverging course. When the occupant turns on the automatic driving using the route-information input device 15 afterwards, the automatic driving along the traveling route restarts.

In still another example situation where the own vehicle M traveling on the middle lane of the road is going to make the route change to the diverging course, the own vehicle M needs to make a lane change from the middle lane to the leftmost lane before making the route change to the diverging course.

To make the route change to the diverging course in this example situation, the own vehicle M needs to make a lane change from the middle lane to the left lane before reaching the fork L0. Hence, to start making the route change at the fork L0, the traveling lane on which the own vehicle M is traveling may be identified first. Thereafter, the number of lane changes n may be set, and the necessary route-change distance Lα corresponding to the number of lane changes n may be selected. In an example situation where the own vehicle M is traveling on a road having three lanes, the number of lane changes may be set to 0 when the own vehicle M is traveling on the left lane, the number of lane changes may be set to 1 when the own vehicle M is traveling on the middle lane, and the number of lane changes may be set to 2 when the own vehicle M is traveling on the right lane. Since this example embodiment is described on the assumption that the own vehicle M is traveling on the road having three lanes, the value of α may be within a range from 1 to 3.

Thereafter, the number of lane changes n may be multiplied by the sum of a time ts [sec] required for each lane change (hereinafter referred to as a "required lane-change time") and a time tw [sec] during which a direction indicator or a blinker is turned on (hereinafter referred to as a "blinker ON time tw") before the lane change. The resultant value of the multiplication may be multiplied by a vehicle speed V [m/sec] of the own vehicle M. A distance Lm [m] of a section necessary for stabilizing the attitude of the own vehicle M (hereinafter referred to as a "stabilizing section distance Lm") may be added to the resultant value. One reason for this is that the own vehicle M needs to have a stable attitude directed to the straight-ahead direction when reaching the fork L0.

In other words, the necessary route-change distance Lα may be calculated by the following expression:

$$L\alpha = n(ts+tw) \cdot V + Lm$$

where α is within a range from 1 to 3 in this example embodiment. In a case where the required lane-change time ts, the blinker ON time tw, and the stabilizing section distance Lm are fixed values, the necessary route-change distance Lα may be determined depending on the number of lane-changes n and the vehicle speed V. For example, the stabilizing section distance Lm may be 0 meters when the own vehicle M is traveling on the left lane.

In an example case where the own vehicle M is traveling on the left lane under the conditions that the required lane-change time ts is 8 seconds, the blinker ON time tw is 3 seconds, the vehicle speed V is 25 meters per second (i.e., 90 [Km/h]), and the stabilizing section distance Lm is 30 meters, a necessary route-change distance L1 on the left lane is 30 meters (L1=Lα=30 [m]). Accordingly, when the own vehicle M reads the candidate route at the position M1 on the left lane as illustrated in FIG. 4, the necessary route change distance L1 is equal to or less than the reach distance Lk (Lk≥L1). Therefore, the route change to the diverging course is achievable.

In another example case where the own vehicle M is traveling on the middle lane, the number of lane changes n is 1 (n=1). The necessary route-change distance L2 on the middle lane may thus be 305 meters. In still another example case where the own vehicle M is traveling on the right lane, the number of lane change n is 2 (n=2). The necessary route-change distance L3 on the right lane may thus be 580 meters.

Thereafter, in Step S13, the necessary route-change distance Lα (where α is within a range from 1 to 3 in this example embodiment) corresponding to the lane on which the own vehicle M is traveling may be compared with the reach distance Lk to the fork, and thereby determine whether the route change to the diverging course is achievable. When the necessary route-change distance Lα is equal to or less than the reach distance Lk (Lα≤Lk) and the route change is determined to be achievable (YES in Step S13), the procedure may branch to Step S14. When the necessary route-change distance Lα is greater than the reach distance Lk (Lα>Lk) and the route change is determined not to be achievable (NO in Step S13), the procedure may proceed to Step S15.

For example, when the own vehicle M reads the candidate route at the position M3 on the middle lane as illustrated in FIG. 4, the route change is not achievable because the necessary route-change distance L2 is not secured. Likewise, when the own vehicle M reads the candidate route at the position M4 on the right lane, the route change is not achievable because the necessary route-change distance L3 is not secured. In one embodiment of the technology, the automatic drive controller 23 that executes Steps S10, S11, and S13 may serve as a "route change achievability determiner".

Thereafter, in Step S14, a determination may be made of whether a vehicle traveling side by side with the own vehicle M, a following vehicle, a preceding vehicle, or another vehicle that hinders the own vehicle from making the lane change is present on the lane to which the own vehicle M is going to make a lane change. The determination may be based on the information from the front traveling environment recognizer 21d of the camera unit 21 and the information from the peripheral environment recognizer 22b of the peripheral monitoring unit 22. Although not illustrated, in an example case where the own vehicle M reads the candidate route at a position on the right lane illustrated in FIG. 4 where the necessary route-change distance L3 is secured, the necessary route-change distance L3 is equal to or less than the reach distance Lk (L3≤Lk). Therefore, the route change to the diverging course is determined to be achievable. However, the lane change of the own vehicle M is determined not to be achievable because a preceding vehicle P traveling on the middle lane hinders the own vehicle M from making the lane change. Meanwhile, in an example case where the own vehicle M reads the candidate route at the position M1 illustrated in FIG. 4, the lane change is determined to be achievable because no vehicle that hinders the own vehicle M from making the lane change is present on the lane on which the own vehicle M is to make a lane change.

After the procedure branches from Step S7 to Step S9, a determination may be made of whether the set route determined before the reconstruction extends in the straight-ahead direction passing by the closest diverging course. When the set route extends in the straight-ahead direction (YES in Step 9), the route change needs not to be made, and the procedure may thus jump to Step S16. In contrast, when the set route extends in the diverging direction along the diverging course (NO in Step S9), the procedure may proceed to Step S12. In one embodiment of the technology, the automatic drive controller 23 that executes Steps S6 to S9 may serve as a "course comparator".

In Step S12, a determination may be made of whether the automatic lane change (ALC) control is being executed. In the ALC control, the automatic drive controller 23 may cause the steering controller 31 to make a lane change in accordance with the set route. In a case where the own vehicle M reads the candidate route at the position M5 illustrated in FIG. 5, the ALC control is already being executed (YES in Step S12). Therefore, switching the traveling direction from the diverging direction to the straight-ahead direction at this timing can cause the own vehicle M to have an unstable traveling attitude. To address such a concern, the procedure may jump from Step S12 to Step S15.

In contrast, in a case where the own vehicle M reads the candidate route at the position M6 illustrated in FIG. 5, the ALC control has not been executed yet (NO in Step S12). Therefore, switching the traveling direction from the diverging direction to the straight-ahead direction at this timing does not cause the own vehicle M to have an unstable traveling attitude. In such a case, the procedure may jump to Step S16.

After the procedure jumps from any one of Steps S12, S13, and S14 to Step S15, a command to change the conditions and recalculate a traveling route may be transmitted to the traveling route setter 12b, and the procedure may return to Step S6. The wording "change the conditions" used herein refers to causing the own vehicle M to keep traveling along the set route determined before the reconstruction regardless of the candidate route extending in the closest diverging course and reconstructing, through the automatic rerouting, a traveling route along which the own vehicle is to follow after passing by the closest diverging course. In one embodiment of the technology, the automatic drive controller 23 that executes Step S15 may serve as an "automatic rerouting unit".

After the procedure proceeds from any one of Steps S8, S9, S12, and S14 to Step S16, a signal commanding to set the candidate route currently constructed as a traveling route may be transmitted to the traveling route setter 12b, and the procedure may return to Step S4. Upon the setting of the candidate route as the traveling route, the notification device 34 may notify the driver of the change in the traveling route.

The traveling route setter 12b may determine the candidate route currently constructed to be the set route, and thereafter transmit the set route to the automatic drive controller 23. The automatic driving is kept continuing along the previous set route determined before the reconstruction until the determination of the candidate route. This allows the driver to keep feeling relaxed without feeling strange or uncomfortable.

After the procedure returns to Step S4 from the Step S16, the automatic driving may be executed on the basis of the candidate route determined to be the set route after the reconstruction.

According to any of the foregoing example embodiments, the traveling route setter 12b reconstructs a traveling route in response to the rerouting request from the occupant (the driver, in most cases) during the automatic driving. In a situation where a candidate route newly constructed is set, from the fork of the closest diverging course, in a direction different from the direction of the set route determined before the reconstruction, and where it is determined, on the basis of the traveling condition of the own vehicle M, that the route change in the different direction is not achievable in time, the automatic driving is kept continuing along the set route determined before the reconstruction. This prevents switching of the traveling mode from the automatic drive mode to the drive assist mode, which mitigates the feeling of confusion or discomfort of the driver.

Although some example embodiments of the technology are described hereinabove, the foregoing embodiments are merely examples and are not intended to limit the scope of the technology. In another example embodiment, the traveling route setter 12b may set multiple candidate routes after the reconstruction. The multiple candidate routes may be read in Step S3 illustrated in FIG. 3, and the occupant may select any one of the candidate routes in Step S6.

It should be appreciated that modifications and alterations of the novel method and apparatus described herein may be made. It should be also appreciated that various omissions, replacements, and modifications may be made in the method and the apparatus described herein, without departing from the scope of the spirit of the technology. The technology is intended to include such modifications and alterations in so far as they fall within the scope of the appended claims or the equivalents thereof.

The map location calculator 12 and the automatic drive controller 23 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the map location calculator 12 and the automatic drive controller 23. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the map location calculator 12 and the automatic drive controller 23 illustrated in FIG. 1.

The invention claimed is:

1. An automatic drive assist apparatus comprising:
a storage configured to hold information on a road map;
an own-vehicle position estimator configured to estimate a current position of an own vehicle;
a route-information input device configured to receive an input of information on a destination;
a traveling route setter configured to construct a first traveling route on a basis of the information on the road map held in the storage, the first traveling route connecting the estimated current position of the own vehicle and the received destination;
one or more sensors configured to monitor another vehicle in a vicinity of the own vehicle; and
an automatic drive controller configured to:
  execute automatic driving of the own vehicle along the first traveling route;
  while the own vehicle travels along the first traveling under the automatic driving, determine that a second traveling route is constructed in response to a rerouting request for changing the first traveling route;
  in response to determining that the second traveling route is constructed, determine that a route change from the first traveling route to the second traveling route is set at an upcoming fork based on determining that the first traveling route instructs the own vehicle to enter a first road at the upcoming fork whereas the second traveling route instructs the own vehicle to enter a second road, different from the first road, at the upcoming fork; and
  in response to determining that the route change is set at the upcoming fork, calculate a distance from the current position of the own vehicle to the upcoming fork on the road map based on the information on the road map;

calculate a necessary route-change distance based on (i) a vehicle speed of the own vehicle and (ii) a number of lane changes that is required to move the own vehicle from a currently traveling lane in which the own vehicle is currently traveling to a lane most adjacent to the second road;

determine that the route change from the first traveling route to the second traveling route at the upcoming fork is achievable based on determining that the necessary route-change distance is equal to or less than the distance from the current position of the own vehicle to the upcoming fork;

in response to determining that the route change from the first traveling route to the second traveling route at the upcoming fork is achievable, determine whether a lane change from the currently traveling lane to the lane most adjacent to the second road is achievable based on data from the one or more sensors;

when the data from the one or more sensors indicates a presence of the another vehicle that hinders the own vehicle from making the lane change, determine that the lane change is not achievable and control the own vehicle to continue to travel along the first traveling route under the automatic driving; and when the data from the one or more sensors indicates an absence of the another vehicle that hinders the own vehicle from making the lane change, determine that the lane is achievable and control the own vehicle to perform the route change from the first traveling route to the second traveling route at the upcoming fork while the own vehicle travels under the automatic driving.

2. The automatic drive assist apparatus according to claim 1, wherein:

in a case where the necessary route-change distance is greater than the distance from the current position of the own vehicle to the upcoming fork, the automatic drive controller determines that the route change is not achievable and controls the own vehicle to continue to travel along the first traveling route under the automatic driving.

3. The automatic drive assist apparatus according to claim 2, further comprising an automatic rerouting unit configured to, in a case where the automatic drive controller determines that the automatic driving is not able to control the own vehicle to enter the second road at the upcoming fork, reconstruct, through automatic rerouting, the second traveling route along which the own vehicle is to follow after the own vehicle enters the first road at the upcoming fork.

4. The automatic drive assist apparatus according to claim 1, wherein:

in a case where the automatic drive controller determines that the automatic driving is able to control the own vehicle to enter the second road at the upcoming fork by keeping driving the own vehicle straight, the automatic drive controller is configured to determine whether automatic lane change control is being executed, and when the automatic lane change control is being executed, the automatic drive controller determines that the automatic driving is not able to control the own vehicle to enter the second road at the upcoming fork.

5. The automatic drive assist apparatus according to claim 4, further comprising an automatic rerouting unit configured to, in a case where the automatic drive controller determines that the automatic driving is not able to control the own vehicle to enter the second road at the upcoming fork, reconstruct, through automatic rerouting, the second traveling route along which the own vehicle is to follow after the own vehicle enters the first road at the upcoming fork.

6. The automatic drive assist apparatus according to claim 1, further comprising an automatic rerouting unit configured to, in a case where the automatic drive controller determines that the automatic driving is not able to control the own vehicle to enter the second road at the upcoming fork, reconstruct, through automatic rerouting, the second traveling route along which the own vehicle is to follow after the own vehicle enters the first road at the upcoming fork.

7. An automatic drive assist apparatus comprising:

a storage configured to hold information on a road map;

a route-information input device configured to receive an input of information on a destination;

one or more sensors configured to monitor another vehicle in a vicinity of the own vehicle; and circuitry configured to:

estimate a current position of an own vehicle;

construct a first traveling route on a basis of the information on the road map held in the storage, the first traveling route connecting the current position of the own vehicle estimated and the destination inputted through the route-information input device; and execute automatic driving of the own vehicle along the first traveling route, wherein the circuitry is configured to: during the automatic driving of the own vehicle, determine whether a second traveling route is constructed in response to a rerouting request for changing the first traveling route;

read, when the second traveling route is constructed, the second traveling route, compare the second traveling route with the first traveling route;

determine that a route change from the first traveling route to the second traveling route is set at an upcoming fork when the comparison shows that the first traveling route instructs the own vehicle to enter a first road at the upcoming fork whereas the second traveling route instructs the own vehicle to enter a second road, different from the first road, at the upcoming fork;

when the route change is set at the upcoming fork, determine whether the automatic driving is able to control the own vehicle to enter the second road at the upcoming fork based at least on determining that a necessary route-change distance is equal to less than a distance from the current position of the own vehicle to the upcoming fork, the necessary route-change distance being determined based on a vehicle speed of the own vehicle and a number of lane changes that is required to move the own vehicle from a currently traveling lane on which the own vehicle is currently traveling to a lane most adjacent to the second road;

when the automatic driving is determined to be able to control the own vehicle to enter the second road at the upcoming fork based at least on the necessary route-change distance and the distance from the current position of the own vehicle to the upcoming fork, determine whether a lane change from the currently traveling lane to the lane most adjacent to the second road is achievable based on data from the one or more sensors;

when the data from the one or more sensors indicates a presence of another vehicle that hinders the own vehicle from making the lane change, determine that the lane change is not achievable and control the own vehicle to continue to travel along the first traveling route under the automatic driving; and when the data from the one or more sensors indicates an absence of another vehicle that hinders the own vehicle from making the lane change, determine that the lane is achievable and control the own vehicle to perform the route change from the first traveling route to the second traveling route at the upcoming fork while the own vehicle travels under the automatic driving.

* * * * *